3,483,166
GALLIUM LACTATE AS A POLYMERIZATION CATALYST IN POLYESTER PREPARATION
Charles Jacob Kibler and Thomas Hassell Larkins, Jr., Kingsport, Tenn., assignors to Eastman Kodak Company, Rochester, N.Y., a corporation of New Jersey
No Drawing. Filed Nov. 3, 1967, Ser. No. 680,305
Int. Cl. C08g 17/013
U.S. Cl. 260—75                                  7 Claims

ABSTRACT OF THE DISCLOSURE

Substantially colorless polyesters of a difunctional dicarboxylic acid and a difunctional glycol which polyesters are useful as fibers, films, etc., are obtained by employing gallium lactate as a polymerization catalyst in the preparation of said polyesters.

---

This invention relates to an improved process for preparing polyesters. In one of its more specific aspects, this invention relates to a new polymerization catalyst for polyester preparation wherein said catalyst is gallium lactate.

The present invention is an improvement over and above the invention disclosed in Smith U.S. Patent 3,254,055, which involves the use of metallic gallium or some of its compounds as polymerization catalysts in the preparation of linear polyesters. However, the use of gallium lactate is not disclosed in the Smith patent.

Many metallic compounds, such as zinc and manganese acetates, are known to be effective catalysts during the ester interchange stage of polyester preparation. In addition, other metallic compounds, such as antimony trioxide and gallium ammonium chloride, are known to be effective catalysts during the polymerization or build-up stage of polyester preparation. However, it is apparent from a consideration of the prior art that no predictions are possible as to what improvements and detrimental effects will be obtained when new metals or a given combination of metals or their compounds are employed as polymerization catalysts.

One of the most critical problems in selecting polymerization catalysts for use in preparing polyesters is the avoidance of color and cloudiness (hazy polymer melt) in the final polyester. This is especially critical in the case of those polyesters to be used to form a support or film base for photographic emulsions (either color or black-and-white). Here the optical requirements are such that substantially colorless polyester is of great importance. Another critical problem is to obtain a non-toxic, non-corrosive catalyst of adequate solubility which is effective in low concentrations. Another requirement, in utilities such as photographic film, is that the catalyst must not have photographic desensitizing activity in the residual amounts which may occur in the final polymer. Co-catalysts such as toxic arsenic and antimony compounds may present health hazards. Compounds such as the hydrate of gallium oxide ($Ga_2O_3$ hydrate) generally do not have the adequate solubility in the reaction mixture. Gallium ammonium chloride may provide a serious corrosion problem in stainless steel equipment. Therefore, there is a great need in the polyester industry for a polymerization catalyst which does not present the above disadvantages.

It is an object of this invention to provide an improved process for preparing fiber- and film-forming, linear, condensation-type polyesters. It is another object of this invention to provide new polymerization catalysts for preparing substantially colorless polyesters which are useful as photographic film base.

It is an additional object of this invention to provide new polymerization catalysts having color-free characteristics so that substantially colorless polyesters of a desired inherent viscosity can be produced in a shorter period of time.

It is an additional object of this invention to provide new polymerization catalysts which are effective at low concentrations. Other objects of this invention will become apparent herein.

These and other objects are attained through the practice of this invention, at least one embodiment of which comprises providing an improved process for preparing substantially colorless, fiber- and film-forming, linear, condensation polyesters from a prepolymer of reactants (A) at least one difunctional dicarboxylic acid and (B) at least one difunctional glycol, wherein the improvement comprises polymerizing the prepolymer in the presence of gallium lactate as a catalyst.

By the term "prepolymer" we mean a low molecular weight compound which is formed by the reaction of reactants (A) at least one difunctional dicarboxylic acid and (B) at least one difunctional glycol. The "prepolymer" generally has an inherent viscosity of from about 0.1 to about 0.45 and may be polymerized by solid phase or melt phase techniques well known in the art.

The quantity of gallium lactate, based on the weight of the final polyester, necessary to achieve rapid polymer build-up and yet produce a colorless polymer is surprisingly small. Less than 100 parts per million (p.p.m.), preferably from 1 p.p.m. to 20 p.p.m. is effective to promote polymerization.

Whenever the term "inherent viscosity" (I.V.) is used in this application, it will be understood to refer to viscosity determinations made at 25° C. using 0.25 gram of polymer per 100 ml. of a solvent composed of 60 percent phenol and 40 percent tetrachloroethane.

The gallium lactate can be used as solutions in ethylene glycol or other glycols or alcohols, examples of which include 1,4-cyclohexanedimethanol; glycerin; methanol; and ethanol.

Gallium lactate, $Ga(O_2CCHOHCH_3)_3$, may be prepared by a number of methods, such as those shown by P. Neogi and S. K. Naudi, J. Indian Chem. Soc., 13, 399–403 (1936), and by H. C. Dudley and R. F. Garzoli, J. Am. Chem. Soc., 70, 3942–3943 (1948). Particularly preferred methods of preparing gallium lactate are disclosed in Larkins and Malcolm U.S. Ser. No. 680,304, filed Nov. 3, 1967, now Patent No. 3,430,729.

The various processes which can be employed in preparing the polyesters of our invention are well known and illustrated in such patents as U.S. 2,465,319; 2,727,881; 2,744,089; 2,901,466; and 3,075,952. These patents illustrate the ester interchange reaction as well as the polymerization or build-up processes. Therefore, it is deemed unnecessary to describe these processes herein.

Our final polyesters generally have a number average molecular weight of from about 12,000 to about 100,000, an inherent viscosity of at least about 0.5, and a melting point of from about 180° C. to about 350° C.

The substantially colorless, fiber- and film-forming, linear, condensation polyesters prepared in accordance with this invention are those of reactants (A) at least one difunctional dicarboxylic acid and (B) at least one difunctional glycol. Suitable acids for preparing these polyesters are aliphatic, alicyclic, and aromatic dicarboxylic acids. Examples of such acids include oxalic; malonic; dimethylmalonic; succinic; glutaric; adipic; trimethyl adipic; pimaleic; 22-dimethylglutaric; azelaic; sebacic; fumaric; maleic; itaconic; 1,3-cyclopentanedicarboxylic; 1,2-cyclohexanedicarboxylic; 1,3-cyclohexanedicarboxylic; 1,4-cyclohexanedicarboxylic; phthalic; terephthalic; isophthalic; 5-butyl isophthalic; 2,5-norbornane dicarboxylic; 1,4- naphthalic; diphenic; 4,4'- oxydibenzoic; diglycolic; thiodipropionic; 2,2,4-trimethyladipic; 4,4'-sulfonyldibenzoic; 2,5-naphthalene dicarboxylic; 2,6-naphthalene dicarboxylic; and 2,7-naphthalene dicarboxylic acids. It will be understood that the corresponding esters of these acids are included in the term "dicarboxylic acid." Examples of these esters include dimethyl-1,4-cyclohexanedicarboxylate; dimethyl - 2,6 - naphthalenedicarboxylate; dimethyl-4,4'-sulfonyldibenzoate; dimethyl isophthalate; dimethyl terephthalate; and diphenyl terephthalate. Copolyesters may be prepared from two or more of the above dicarboxylic acids or esters thereof.

Suitable glycols for preparing these polyesters are aliphatic, alicyclic, and aromatic glycols. Examples of such glycols include ethylene; diethylene glycol; 2,2-dimethyl-1,3-propanediol; 2-ethyl-2-butyl-1,3-propanediol; 2,2-diethyl-1,3-propanediol; 2-methyl-2-propyl-1,3-propanediol; 2-ethyl-2-isobutyl-1,3-propanediol; 1,3-butanediol; 1,4-butanediol; 1,5-pentanediol; 1,6-hexanediol; 2,2,4-trimethyl-1,6-hexanediol; 1,2-cyclohexanedimethanol; 1,3-cyclohexanedimethanol; 1,4-cyclohexanedimethanol; 2,2,4,4-tetramethyl-1,3-cyclobutanediol; o-, m-, and p-xylylene diols; 4,4'-sulfonyldiphenol; 4,4'-oxydiphenol; 4,4'-isopropylidenediphenol; and 2,5-naphthalenediol. Copolyesters may be prepared from two or more of the above diols.

Especially preferred polyesters are poly(ethylene terephthalate) and poly(1,4-cyclohexylenedimethylene terephthalate).

The processes with which this invention is concerned involved the initial preparation, in the presence of a catalyst, of a substantially monomeric prepolymer by the reaction of the acid with the glycol. This reaction is also referred to as the first stage of the polyester preparation and can be conducted under a variety of conditions. Well-known catalysts can be used here, examples of which are compounds of zinc, cobalt, manganese, magnesium, and calcium.

The second stage of the polyester preparation involves taking the prepolymer produced during the first stage and causing the prepolymer molecules to undergo a polymerization or chain build-up reaction whereby long chain polyester molecules are produced. It is in this polymerization reaction that gallium lactate is unexpectedly advantageous as a catalyst.

Gallium lactate may be added to the reaction mixture either prior to ester interchange or prior to polymerization of the prepolymer. However, when zinc compounds are used as ester interchange catalysts, the gallium lactate is preferrably added after the initial reaction.

The gallium lactate and ester interchange catalyst may be added as a solution, suspension, or with one of the reaction ingredients in accordance with well know procedures.

This invention will be further illustrated by the following examples of preferred embodiments, although it will be understood that these examples are included merely for purposes of illustration and are not intended to limit the scope of the invention. Examples 1–6 relate to the preparation of gallium lactate.

EXAMPLE 1

To 100 grams gallium metal is added 500 ml. concentrated hydrochloric acid. As the mixture is heated at gentle reflux, 100 ml. concentrated nitric acid is slowly added over a period of one hour. The gallium trichloride-trinitrate solution is then diluted with water (without cooling) to 2,000 ml., and 475 grams (a ten percent excess) of 2,4-pentanedione is added. The pH is adjusted to 6.8 using ammonium hydroxide and is maintained at this value with stirring but no external heating for 90 minutes. The mixture is filtered and the product washed carefully with two 3,000 ml. portions of water. The precipitate is dissolved at 40–50° C. in a solution consisting of 500 grams (five percent excess) of an 85 percent solution of lactic acid in water to which approximately 2,000 ml. water has been added. The solution is filtered free of trash and evaporated to crystallize gallium lactate. Any excess lactic acid is removed by washing the product with acetone. The product, upon drying, is gallium lactate, $Ca(O_2CCHOHCH_3)_3$. The yield is in excess of 95 percent based on gallium metal used.

EXAMPLE 2

In a similar manner to that taught in Example 1, 575 grams benzoic acid is added to the gallium trichloride-trinitrate solution containing 100 grams gallium metal and the pH adjusted to 6.4. The precipitate is collected and washed as before and added to 500 grams 85 percent lactic acid solution in 2,000 ml. water. After heating for one hour at 80° C., the liberated benzoic acid is removed by filtration and the gallium lactate collected by crystallization.

EXAMPLE 3

In a manner similar to that taught in Example 1, 415 grams 3-hydroxy-2-butanone is added to the gallium trichloride-trinitrate solution and the pH adjusted to 5.5–6.0. The gallium lactate is worked up as in Example 1.

EXAMPLE 4

In a manner similar to that taught in Example 1, terephthalic acid is substituted for 2,4-pentanedione. Terephthalic acid (390 grams) is dissolved in a minimum quantity of water to which sufficient concentrated ammonium hydroxide solution is added to provide 160 grams of $NH_4OH$ and to the resulting solution is added the gallium trichloride-trinitrate solution containing 100 grams gallium metal. The pH is adjusted to 4.5 and the gallium lactate worked up as in Example 1.

EXAMPLE 5

Gallium oxide may be used as the gallium source instead of gallium metal as taught in Examples 1–4. To 154 grams gallia hydrate (65.3 percent gallium, equivalent to 100 grams gallium metal) and 176 grams sodium hydroxide is added 700 ml. water. After about one hour at 80° C., the solution is filtered free of trash. This solution can be used in Examples 1–4 in place of gallium trichloride-trinitrate solution. The pH is adjusted using hydrochloric acid instead of ammonium hydroxide. Otherwise, the gallium lactate is prepared as described in Examples 1–4.

EXAMPLE 6

A quantity of 100 grams gallium metal is placed in a two-liter beaker and 500 ml. of concentrated hydrochloric acid (37–38 percent HCl, sp. gr. 1.19) is added. The hydrochloric acid is heated to about 70° C. and 100 ml. of concentrated nitric acid (70–71 percent $HNO_3$, sp. gr. 1.42) is added dropwise over a 40-minute period. The solution is cooled to room temperature, diluted to 2,000 ml. with water, and ammonium hydroxide (1:1 by volume concentrated $NH_4OH$, 28–30 percent $NH_4OH$, sp. gr. 0.90 diluted with an equal volume of $H_2O$) is added to adjust the pH to 6.5–7.0. The precipitate is collected by centrifugation and washed repeatedly with a volume of water approximately four times the bulk of the precipitate. The precipitate is washed until a silver nitrate test for halogen is negative for the wash water. This washing operation should be carried out in a relatively short period of time (optionally within two to three hours). The washed precipitate is added to 500 ml. 85 percent lactic acid and 500 ml. $H_2O$ and heated until the filter cake dissolves (usually less than one hour at 70° C.). The solution is filtered and evaporated at approximately 70° C. until only about 500 ml. liquid remains. The plate-like product should be collected periodically by decantation during the evaporation process. The product (solid) from each decantation step is ground with 500 ml. acetone, in 250 ml. portions, to remove excess lactic acid, and filtered. The product is air dried. The yield of gallium lactate is approximately 95 percent based on gallium metal used.

EXAMPLE 7

A mixture of 77.6 grams (0.4 mole) of dimethyl terephthalate, 49.6 grams (0.8 mole) of ethylene glycol, 0.022 gram of zinc acetate dihydrate [designated below as $Zn(OAc)_2$] are charged into a 500 ml. flask. The flask is swept by nitrogen and immersed in metal heated at 195–200° C. After heating with stirring for one hour, the theoretical amount of methanol is collected, and the temperature is raised to 275° C. At this point, 0.70 ml. of a one percent solution of gallium lactate (15 p.p.m. of Ga based on product resin) dissolved in ethylene glycol is added. Vacuum is applied to the colorless melt to give a pressure of less than 0.2 mm. of mercury absolute, and polymerization is continued for one hour. The final product is a water-white, clear melt which crystallizes to a white solid on cooling. It has an inherent viscosity of 0.69.

EXAMPLE 8

The procedure of Example 7 is repeated except that the gallium lactate is omitted. The product has an I.V. of 0.58 and is light yellow in color.

EXAMPLE 9

The procedure of Example 7 is repeated except that the gallium (15 p.p.m.) is added at the start of the reaction. The final product is colorless, but the product has an I.V. of only 0.43. This example illustrates that gallium lactate is an inhibitor for the zinc acetate in the ester interchange reaction.

EXAMPLE 10

The procedure of Example 7 is repeated except that manganese acetate (100 p.p.m.) based on the final polymer is used as the ester interchange catalyst in place of the zinc acetate. After completion of the ester interchange, 0.7 ml. (15 p.p.m.) of a 0.1 percent solution of gallium lactate in ethylene glycol is added, and the polymerization carried out in the usual manner. The product has an I.V. of 0.68 and is substantially colorless.

EXAMPLE 11

The procedure of Example 10 is repeated adding the manganese acetate and gallium lactat at the beginning of the reaction. In this case, as contrasted with Example 9, the ester interchange and polymerization proceeds normally, and a substantially colorless product with an I.V. of 0.65 is obtained.

EXAMPLE 12

The results summarized in Table I are obtained in large scale batch equipment in which 100 pounds of poly(ethylene terephthalate) is prepared in the normal batch-type melt equipment using the following reaction conditions: (1) ester interchange at 190° C. to 200° C. for 1½ hours and (2) polymerization for 1½ hours at 270° C. to 275° C. under a vacuum of less than one mm. of mercury. Example 12A of Table I is a control experiment using zinc and antimony salts as catalysts. Examples 12B through 12E illustrate the efficiency of very small amounts of gallium lactate. The ideal amount of gallium, as gallium lactate, appears to be about five to ten p.p.m., that is, five to ten gram atoms of Ga per million grams of the final polymer. The color ratings are made on a Gardner Color Difference Meter. The Rd value is a reflectance measurement in percent; higher values mean greater brightness. The "a value" is a measure of red (+) or green (−). The "b value" is a measure of yellow (+) or blue (−). The sock gradings are arbitrary selections of socks knit from spun yarn and represent the number of observers who chose that sock as the best whiteness.

TABLE I

| | Catalyst (p.p.m.) | | | Melting Point, ° C. | Color I.V. | (CDM Values) [a] | | | Sock Gradings [b] |
|---|---|---|---|---|---|---|---|---|---|
| | Zn | Sb | Ga | | | Rd | a | b | |
| A | 90 | 370 | 0 | 246 | 0.67 | 70.8 | −1.8 | +5.7 | 2 |
| B | 90 | 0 | 2.5 | 252 | 0.70 | 78.5 | −0.3 | +3.6 | 6 |
| C | 90 | 0 | 5.0 | 251 | 0.64 | 77.8 | −1.3 | +3.9 | 6 |
| D | 90 | 0 | 10.0 | 252 | 0.63 | 77.0 | −1.3 | +4.1 | 10 |
| E | 90 | 0 | 20.0 | 252 | 0.68 | 78.8 | −2.0 | +4.7 | 3 |

[a] Color as determined on Gardner Color Meter: −a=green; +a=red; +b=yellow; −b=blue.
[b] Highest number is the whitest.

EXAMPLE 13

The solid phase process can also be employed for the preparation of high molecular weight poly(ethylene terephthalate). In the process, a low molecular weight prepolymer having an I.V. of about 0.15 to 0.40 is first prepared as described in Example 7, except that the vacuum melt step is carried out for only 5–10 minutes. This prepolymer is poured into water, or cast into a solid under an inert atmosphere. The brittle polymer is ground to a powder and polymerized by heating under a vacuum of 0.1 mm. of mercury for three hours at 240° C. The results of using different catalysts and different times of adding the polymerization catalyst are illustrated in Table II.

TABLE II

| | Ester Interchange Catalyst (p.p.m.) | Ga Lactate (p.p.m.) as Ga | Final I.V. of Polymer [a] | | Color |
|---|---|---|---|---|---|
| | | | When Ga Added at Start | When Ga Added after Ester Interchange Catalyst | |
| A | 65 $Zn(OAc)_2$ | 10 | 0.35 | | White. |
| B | 65 $Zn(OAc)_2$ | 10 | | 0.66 | Do. |
| C | 130 $Zn(OAc)_2$ | 10 | 0.57 | | Do. |
| D | 130 $Zn(OAc)_2$ | 10 | | 0.67 | Do. |
| E | 65 $Zn(OAc)_2$ | 20 | 0.58 | | Do. |
| F | 65 $Zn(OAc)_2$ | 20 | | 0.75 | Do. |
| G | 65 $Zn(OAc)_2$ | 65 | 0.25 | | Lt. yellow. |
| H | 65 $Zn(OAc)_2$ | 65 | | 0.69 | Yellow. |
| I | 210 $Zn(OAc)_2$ | 25 | | 0.69 | Do. |
| J | 210 $Zn(OAc)_2$ | 50 | | 0.75 | Do. |
| K | 100 $Ca(OAc)_2$ | 20 | 0.51 | | White. |
| L | 100 $Zn(OAc)_2$ | 20 | | 0.47 | Do. |
| M | 100 $Zn(OAc)_2$ | | [b] 0.23 | | Do. |
| N | 100 $Mg(OAc)_2$ | 20 | 0.71 | | Do. |
| O | 100 $Mg(OBc)_2$ | 20 | | 0.70 | Do. |
| P | 100 $Mg(OBc)_2$ | | [b] 0.29 | | Do. |
| Q | 100 $Mn(OBz)_2$ | 20 | 0.78 | | Do. |
| R | 100 $Mn(OBz)_2$ | 20 | | 0.76 | Do. |
| S | 100 $Mn(OBz)_2$ | | [b] 0.45 | | Do. |

[a] I.V. after solid phase polymerization for three hours at 240° at less than 0.1 mm. of mercury.
[b] No gallium lactate added to these reactions.

Again it can be seen that gallium lactate gives polymerization with a zinc co-catalyst if it is added after the ester interchange. The other catalysts give high I.V. polymer of good color whether Ga lactate is added before or after the ester interchange. Examples 13M, 13P, and 13S show that very little polymerization occurs if gallium lactate is omitted.

The invention has been described in detail with particular reference to preferred embodiments thereof, but it will be understood that variations and modifications can be effected within the spirit and scope of the invention as described hereinabove and as defined in the appended claims.

We claim:

1. In a process for preparing a substantially colorless, fiber- and film-forming, linear, condensation polyester from a polyester prepolymer of reactants (A) at least one difunctional dicarboxylic acid and (B) at least one difunctional glycol, the improvement which comprises polymerizing the prepolymer in the presence of gallium lactate as a polymerization catalysts.

2. A process as defined by claim 1 wherein the polyester is poly(ethylene terephthalate).

3. A process as defined by claim 1 wherein the polyester is poly(1,4-cyclohexylenedimethylene terephthalate).

4. A process as defined by claim 1 wherein the polyester prepolymer has an inherent viscosity of from about 0.1 to about 0.45 determined at 25° C. using 0.25 gram of ploymer per 100 ml. of a solvent composed of 60 percent phenol and 40 percent tetrachloroethane.

5. A process as defined by claim 1 wherein the fiber- and film-forming polyester has an inherent viscosity of at least about 0.5 determined at 25° C. using 0.25 gram of polymer per 100 ml. of a solvent composed of 60 percent phenol and 40 percent tetrachloroethane.

6. A process as defined by claim 1 wherein the polyester prepolymer is polymerized by a solid phase process.

7. A process as defined by claim 1 wherein the polyester prepolymer is polymerized by a melt phase process.

References Cited

UNITED STATES PATENTS 3,254,055   5/1966   Smith _____ 260—75

WILLIAM H. SHORT, Primary Examiner

L. P. QUAST, Assistant Examiner

U.S. Cl. X.R.

260—429, 475